US012319273B2

(12) United States Patent
Kosaka et al.

(10) Patent No.: US 12,319,273 B2
(45) Date of Patent: Jun. 3, 2025

(54) TURNING BEHAVIOR CONTROL DEVICE FOR VEHICLE

(71) Applicants: SUBARU CORPORATION, Tokyo (JP); TOYOTA JIDOSHA KABUSHIKI KAISHA, Aichi-ken (JP)

(72) Inventors: Nozomi Kosaka, Tokyo (JP); Masahiro Saito, Tokyo (JP); Koji Matsuno, Tokyo (JP); Yoshinori Maeda, Toyota (JP); Toyoyuki Motomura, Susono (JP)

(73) Assignees: SUBARU CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 57 days.

(21) Appl. No.: 18/363,436

(22) Filed: Aug. 1, 2023

(65) Prior Publication Data
US 2024/0051518 A1    Feb. 15, 2024

(30) Foreign Application Priority Data
Aug. 12, 2022    (JP) .................................. 2022-128903

(51) Int. Cl.
*B60W 30/045*    (2012.01)
*B60W 10/18*    (2012.01)
*B60W 40/114*    (2012.01)

(52) U.S. Cl.
CPC .......... *B60W 30/045* (2013.01); *B60W 10/18* (2013.01); *B60W 40/114* (2013.01);
(Continued)

(58) Field of Classification Search
CPC .. B60W 30/045; B60W 10/18; B60W 40/114; B60W 2510/207; B60W 2520/14;
(Continued)

(56) References Cited

U.S. PATENT DOCUMENTS

2005/0102085 A1* 5/2005 Sakata .................... B60T 8/172
701/72
2005/0216164 A1* 9/2005 Sakata .................. B60T 8/1755
340/440

(Continued)

FOREIGN PATENT DOCUMENTS

JP    H10-044960 A    2/1998
JP    2014043213 A  * 3/2014
(Continued)

*Primary Examiner* — Harry Y Oh
(74) *Attorney, Agent, or Firm* — Rimon P.C.

(57) ABSTRACT

A turning behavior control device for a vehicle includes a yaw rate detection unit, a brake unit, a drive source, and a travel control unit. The travel control unit includes a deviation value calculation unit that calculates a deviation between a reference yaw rate for determining the degree of understeer during turning of the vehicle and an actual yaw rate detected by the yaw rate detection unit, a braking force control unit that outputs, to the brake unit, a first signal for applying the braking force to a turning inner-side rear wheel or a turning inner-side front wheel when determining that the deviation exceeds a predetermined deviation reference value, and a driving force control unit that outputs, to the drive source, a signal for applying a driving force to a turning outer-side rear wheel or a turning outer-side front wheel when the braking force control unit outputs the signal.

5 Claims, 11 Drawing Sheets

(52) U.S. Cl.
CPC ... *B60W 2510/207* (2013.01); *B60W 2520/14* (2013.01); *B60W 2720/403* (2013.01)

(58) Field of Classification Search
CPC ....... B60W 2720/403; B60W 2720/14; B60W 2720/30; B60W 2720/406; B60W 10/04; B60W 10/184; B60W 30/18145; B60W 10/188; B60W 40/10; B60W 2520/10
See application file for complete search history.

(56) References Cited

U.S. PATENT DOCUMENTS

2019/0126976 A1* 5/2019 Murayama ...... B60W 30/18145
2020/0094797 A1 3/2020 Shoji

FOREIGN PATENT DOCUMENTS

| JP | 2020-050024 A | 4/2020 | |
|---|---|---|---|
| JP | 2022110907 A * | 7/2022 | .......... B60L 15/2009 |

* cited by examiner

TURNING BEHAVIOR CONTROL DEVICE FOR VEHICLE

CROSS-REFERENCE TO RELATED APPLICATIONS

The present application claims priority from Japanese Patent Application No. 2022-128903 filed on Aug. 12, 2022, the entire contents of which are hereby incorporated by reference.

BACKGROUND

Technical Field

The present disclosure relates to a turning behavior control device for a vehicle that efficiently reduces understeer when a high degree of understeer is detected during turning.

Related Art

In travel trajectory control (also referred to as "lane keeping control") as automatic steering control, when a deviation between a target travel trajectory of a vehicle and an actual travel trajectory of the vehicle increases, steered wheels are steered, and feedback control is performed such that the actual travel trajectory converges to the target travel trajectory. For example, as the degree of understeer acting on the vehicle increases when a turning radius of the actual travel trajectory of the vehicle is larger than a turning radius set as the target travel trajectory and a difference therebetween is large, a steering control device attempts to steer the steered wheels in a turning-increasing direction to correct the turning radius to the turning radius set as the target travel trajectory.

However, for example, when front wheels are the steered wheels and drive wheels, a ground contact load of a turning inner-side front wheel decreases due to load transfer in a lateral direction acting on the vehicle along with the turning. Therefore, even when the turning inner-side front wheel is turned in the turning-increasing direction, a lateral force of the turning inner-side front wheel may not increase sufficiently, and a necessary yaw moment cannot be applied to the vehicle. As a result, it is difficult to converge the actual travel trajectory of the vehicle to the target travel trajectory.

As a countermeasure against this, for example, Japanese Unexamined Patent Application Publication (JP-A) No. JP2020-050024 discloses a technique in which, when a deviation between a reference yaw rate (target yaw rate) of a vehicle and an actual yaw rate exceeds a predetermined deviation reference value and a time change rate of the deviation exceeds a start reference value during turning, a braking force is applied to a turning inner-side drive wheel and load transfer from a turning outer-side drive wheel to the turning inner-side drive wheel is generated, thereby increasing a ground contact load of the turning inner-side drive wheel.

SUMMARY

An aspect of the present disclosure provides a turning behavior control device for a vehicle in which left and right front wheels are steered wheels. The turning behavior control device includes a yaw rate detection unit, a brake unit, a drive source, a travel control unit. The yaw rate detection unit is configured to detect an actual yaw rate acting on a vehicle. The brake unit is configured to independently apply a braking force to the left and right front wheels and left and right rear wheels. The drive source is configured to drive the left and right front wheels and the left and right rear wheels. The travel control unit configured to control the braking force of the brake unit and an output of the drive source. The travel control unit includes a deviation value calculation unit configured to calculate a deviation between a reference yaw rate for determining the degree of understeer during turning of the vehicle and the actual yaw rate detected by the yaw rate detection unit, a braking force control unit configured to output, to the brake unit, a first signal for applying the braking force to one of a turning inner-side rear wheel and a turning inner-side front wheel when determining that the deviation calculated by the deviation value calculation unit exceeds a predetermined deviation reference value, and a driving force control unit configured to output, to the drive source, a signal for applying a driving force to one of a turning outer-side rear wheel and a turning outer-side front wheel when the braking force control unit outputs the first signal.

BRIEF DESCRIPTION OF DRAWINGS

The accompanying drawings are included to provide a further understanding of the disclosure and are incorporated in and constitute a part of this specification. The drawings illustrate embodiments and, together with the specification, serve to describe the principles of the disclosure.

DESCRIPTION OF EMBODIMENTS

Incidentally, in an initial stage in which a high degree of understeer is detected, by applying transient load transfer to the turning inner-side drive wheel, the degree of understeer can be efficiently reduced.

However, in the technique disclosed in JP-A No. JP2020-050024, when a high degree of understeer is detected, a constant braking force is continuously applied to the turning inner-side drive wheel, and static load transfer is simply generated from the turning outer-side drive wheel to the turning inner-side drive wheel, and therefore, it may be difficult to efficiently reduce the degree of understeer in the initial stage. As a result, a delay occurs in the control for reducing the degree of understeer, which may make occupants including a driver uncomfortable.

It is desirable to provide a turning behavior control device for a vehicle capable of efficiently reducing understeer when a high degree of understeer is detected and capable of reducing discomfort given to occupants including a driver.

Hereinafter, an embodiment of the present disclosure will be described with reference to the drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
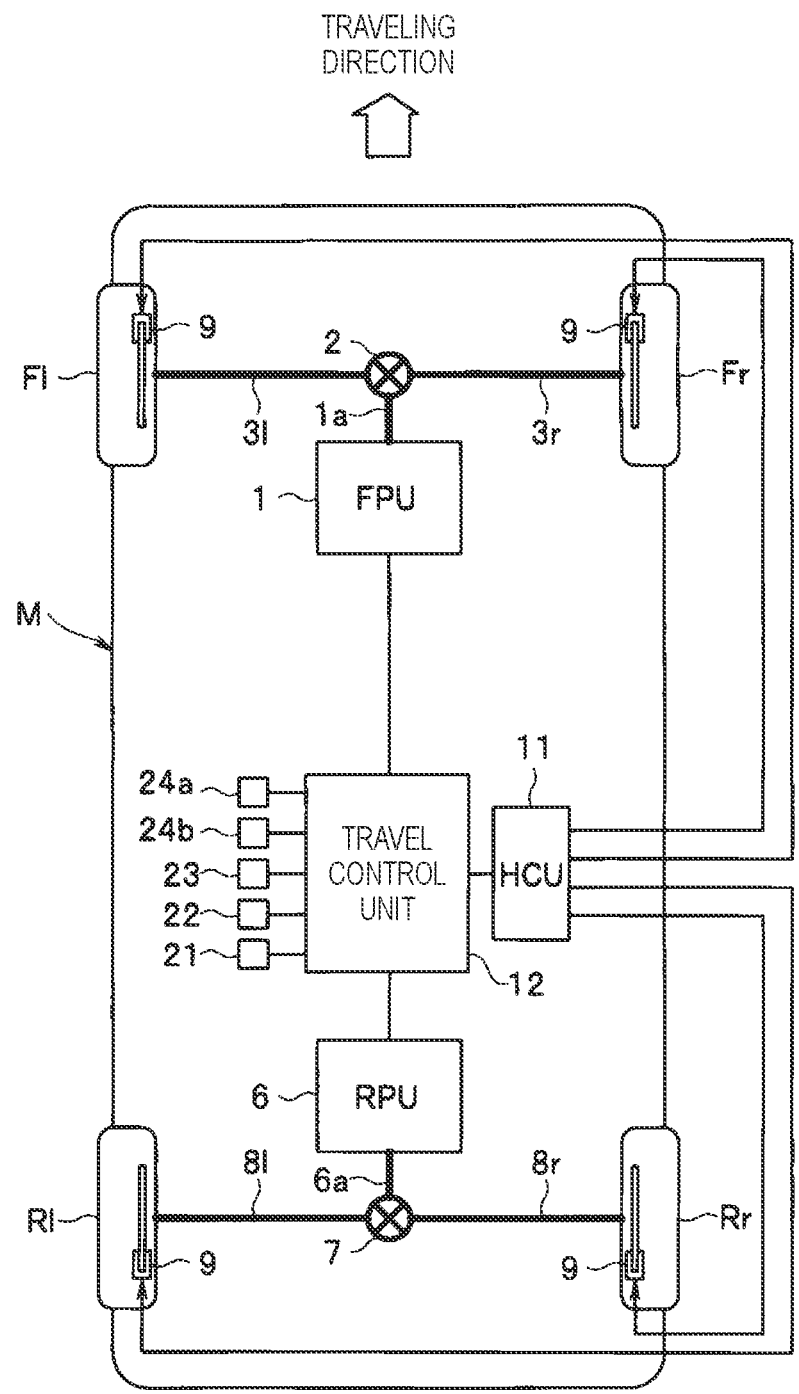
FIG. 1 is a schematic configuration diagram of a driving assistance device.

A vehicle M shown in FIG. 1 is a four-wheel drive vehicle in which front wheels Fl, Fr and rear wheels Rl, Rr, which are steered wheels, are driven by different drive sources (engines or electric motors) 1 and 6. An output shaft 1a of a front drive source (FPU) 1 is coupled to drive shafts (front wheel drive shafts) 3l, 3r of the front wheels Fl, Fr via a front differential 2. An output shaft 6a of a rear drive source (RPU) 6 is coupled to drive shafts (rear wheel drive shafts) 8l, 8r of the rear wheels Rl, Rr via a rear differential 7. Although not shown, left and right front wheels Fl, Fr are respectively supported by front wheel suspensions, and left and right rear wheels Rl, Rr are respectively supported by rear wheel suspensions.

The left and right front wheels Fl, Fr and the left and right rear wheels Rl, Rr are each provided with a hydraulic brake mechanism 9. The hydraulic brake mechanism 9 is a well-known friction brake device such as a disc brake or a drum brake, and a piston of a wheel cylinder of the hydraulic brake mechanism 9 is operated by a hydraulic brake pressure supplied from a hydraulic control unit (HCU) 11 as a brake unit to apply a hydraulic braking (friction braking) force. The HCU 11 includes actuators and valves such as a hydraulic pressure generating device including a booster pump, an accumulator, and the like, a pressure control valve that adjusts a hydraulic pressure during brake differential operation and supplies the adjusted hydraulic pressure to the wheel cylinder of the hydraulic brake mechanism 9, and an opening and closing control valve that opens and closes a hydraulic circuit that supplies the hydraulic brake pressure to the hydraulic brake mechanism 9.

The front drive source 1, the rear drive source 6, and the HCU 11 are operated by a control signal from a travel control unit 12 as a travel control unit. The travel control unit 12 includes a microcontroller provided with a CPU, a RAM, a ROM, a rewritable nonvolatile memory (flash memory or EEPROM), and peripheral devices. The ROM stores programs, fixed data, and the like necessary for the CPU to execute various types of processing. The RAM is provided as a work area of the CPU and temporarily stores various types of data in the CPU. The CPU is also called a microprocessor (MPU) or a processor. Instead of the CPU, a graphics processing unit (GPU) or a graph streaming processor (GSP) may be used. Alternatively, the CPU, the GPU, and the GSP may be selectively used in combination.

In addition to normal travel control, the travel control unit 12 has a turning behavior control function of restoring a ground contact load of the turning inner-side front wheel and increasing a lateral force of the turning inner-side front wheel to reduce the degree of understeer.

Sensors that detect a driving state of the vehicle M, such as a steering angle sensor 21 that detects a steering angle of the left and right front wheels Fl, Fr, a vehicle speed sensor 22 that detects a vehicle speed (host vehicle speed) of the vehicle M, a yaw rate sensor 23 serving as a yaw rate detection unit that detects an actual yaw rate acting on a vehicle body, torque sensors 24a, 24b that individually detect shaft torques acting on the output shafts 1a, 6a of the drive sources 1, 6, and the like are coupled to an input side of the travel control unit 12.

In the turning behavior control by the travel control unit 12, in a case where a high degree of understeer occurs when the vehicle M is traveling on a curved road, a braking force or a driving force is selectively applied to the wheels Fl, Fr, Rl, Rr according to a traveling state of the vehicle M to reduce the degree of understeer. Hereinafter, the braking force and the driving force may be collectively referred to as a "braking/driving force". When at least one of the drive sources 1 and 6 is an electric motor, the travel control unit 12 can apply a braking (regenerative braking) force to the wheels by a regenerative operation of the electric motor. Further, the travel control unit 12 can apply a braking force to the wheels driven by the electric motor through the cooperation of friction braking and regenerative braking. In this case, the electric motor serves as a brake unit.

In this case, in the vehicle M, to reduce a change in pitch attitude of the vehicle M during braking deceleration, the front wheel suspensions have an anti-dive geometry, and the rear wheel suspensions have an anti-lift geometry. That is, instantaneous centers of the left and right front wheels Fl, Fr suspended from the vehicle body by the left and right front wheel suspensions are set to be located above ground contact points of the left and right front wheels Fl, Fr and on a rear side of the vehicle body. Therefore, the left and right front wheel suspensions have the anti-dive geometry.

On the other hand, instantaneous centers of the left and right rear wheels Rl, Rr suspended from the vehicle body by the left and right rear wheel suspensions are set to be located above ground contact points of the left and right rear wheels Rl, Rr and on a front side of the vehicle body. Therefore, the rear wheel suspensions have the anti-lift geometry. Accordingly, when a braking/driving force is applied to the wheels, vertical forces are applied from the wheels to the vehicle body.

For example, when a braking force is applied to a turning outer-side front wheel, an upward force is generated on a turning outer side of a front portion of the vehicle body of the vehicle M, the roll of the vehicle body is prevented, and the ground contact load of the turning inner-side front wheel further increases. Conversely, when a braking force is applied to a turning outer-side rear wheel, a downward force is generated on a turning outer side of a rear portion of the vehicle body, and the ground contact load of the turning inner-side front wheel located diagonally cannot be sufficiently increased.

Figure 2:
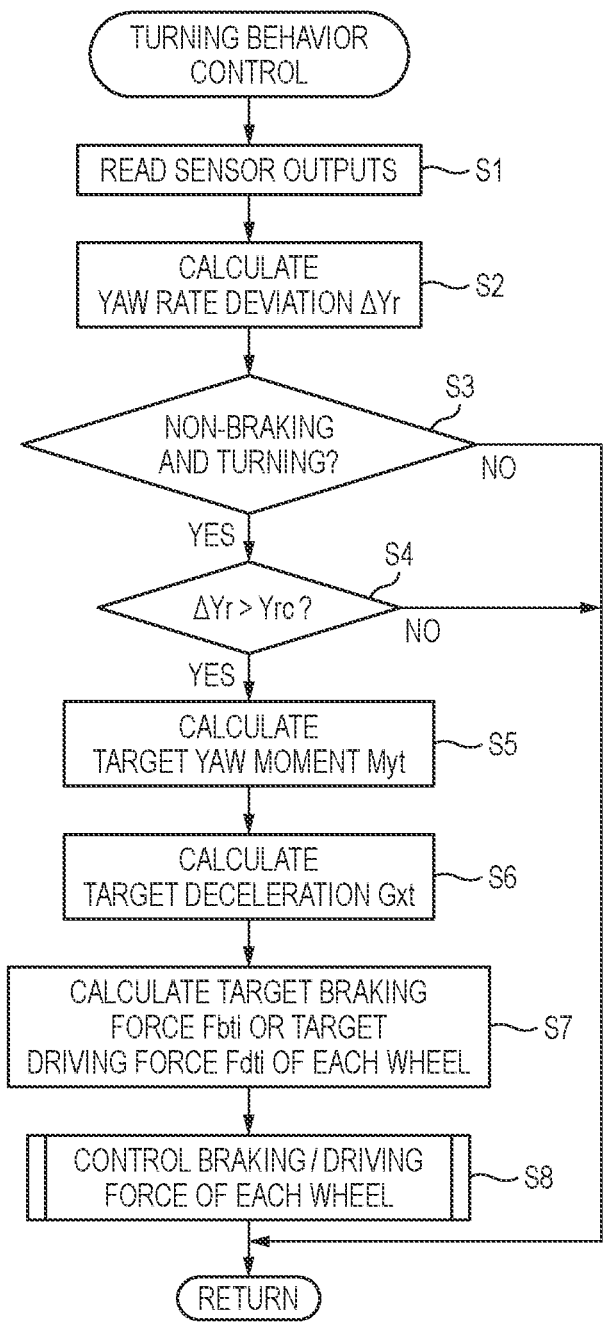
FIG. 2 is a flowchart showing a turning behavior control routine.

Specifically, the turning behavior control by the travel control unit 12 is executed according to a turning behavior control routine shown in FIG. 2. This routine is executed at every predetermined calculation cycle after the travel control unit 12 is activated. First, in step S1, sensor outputs such as a steering angle detected by the steering angle sensor 21, a vehicle speed detected by the vehicle speed sensor 22, and an actual yaw rate detected by the yaw rate sensor 23 are read.

Next, the process proceeds to step S2, a reference yaw rate acting on the vehicle M is calculated based on the steering angle and the vehicle speed, and a yaw rate deviation ΔYr is obtained based on a difference between the reference yaw rate and the actual yaw rate detected by the yaw rate sensor 23. The processing in step S2 corresponds to a deviation value calculation unit of the present disclosure.

Thereafter, the process proceeds to step S3, and it is checked whether the vehicle M is in a non-braking state and is turning. Whether the vehicle M is in the non-braking state is determined based on whether a braking signal is output from the travel control unit 12 to the HCU 11. Whether the vehicle M is turning is determined based on an output value of the yaw rate sensor 23.

When it is determined that the vehicle M is in the non-braking state and is turning, the process proceeds to step S4. When it is determined that the vehicle M is in a braking state or is not turning, the routine is exited.

When proceeding to S4, the yaw rate deviation ΔYr is compared with a predetermined deviation reference value Yrc. The deviation reference value Yrc is a reference value for checking whether the degree of understeer occurring in the vehicle M is high, and is set in advance based on an experiment or the like.

When ΔYr>Yrc, it is determined that the degree of understeer is high, and the process proceeds to step S5. On the other hand, when ΔYr≤Yrc, it is determined that a high degree of understeer has not occurred, and the routine is exited.

When the process proceeds to step S5, a target yaw moment Myt for ensuring the traveling stability of the vehicle M is obtained based on the yaw rate deviation ΔYr by referring to a map or the like. Next, the process proceeds to step S6, and a target deceleration Gxt for reducing a current yaw moment to the target yaw moment Myt is obtained.

Thereafter, the process proceeds to step S7, in which it is determined to which of the wheels Fl, Fr, Rl, and Rr a braking/driving force is applied based on the target yaw moment Myt and the target deceleration Gxt, and a target braking force Fbti or a target driving force Fdti of the wheels Fl, Fr, Rl, and Rr to which the braking/driving force is applied is obtained. Then, the process proceeds to step S8, in which the travel control unit 12 controls the HCU 11 and the front drive source 1 or the rear drive source 6 such that the wheels Fl, Fr, Rl, Rr to which the braking/driving force is applied have the corresponding target braking force Fbti or target driving force Fdti (where i=Fl, Fr, Rl, Rr), and the routine is exited. The processing in steps S4 to S8 corresponds to a braking force control unit and a driving force control unit of the present disclosure.

Next, a behavior when a braking/driving force is selectively applied to the wheels Fl, Fr, Rl, Rr will be described.

Load Transfer Amount in Roll Direction

Load transfer amounts in a roll direction, that is, a load transfer amount $\Delta W_f$ from the turning inner-side front wheel (Fl) to the turning outer-side front wheel (Fr) and a load transfer amount $\Delta W_r$ from a turning inner-side rear wheel (Rl) to the turning outer-side rear wheel (Rr) are expressed by the following formula (1) and (2):

$$\Delta W_f = \frac{a_y m_s}{d}\left[\frac{K_{\varphi f} h_s}{K_{\varphi f} + K_{\varphi r}} + \frac{L_r}{L} h_f\right] + \quad (1)$$

$$\frac{1}{2}\left[(F_{xfi} - F_{xfo})\frac{K_{\varphi r}}{K_{\varphi f} + K_{\varphi r}}\tan\theta_f + (F_{xri} - F_{xro})\frac{K_{\varphi f}}{K_{\varphi f} + K_{\varphi r}}\tan\theta_r\right]$$

$$\Delta W_r = \frac{a_y m_s}{d}\left[\frac{K_{\varphi r} h_s}{K_{\varphi f} + K_{\varphi r}} + \frac{L_f}{L} h_r\right] - \quad (2)$$

$$\frac{1}{2}\left[(F_{xfi} - F_{xfo})\frac{K_{\varphi r}}{K_{\varphi f} + K_{\varphi r}}\tan\theta_f + (F_{xri} - F_{xro})\frac{K_{\varphi f}}{K_{\varphi f} + K_{\varphi r}}\tan\theta_r\right]$$

where $m_s$ is a sprung mass of the vehicle body; d is a tread; $h_s$ is a height of a center of gravity G of the vehicle M; and $K_{\varphi f}$ and $K_{\varphi r}$ are the roll stiffness of the vehicle body at positions of the front wheels and the rear wheels in a vehicle longitudinal direction; φ is a roll angle of the vehicle M; $a_y$ is a lateral acceleration of the vehicle M, and the roll angle φ and the lateral acceleration $a_y$ have positive values when the vehicle M is turning left and have negative values when the vehicle M is turning right; $F_{xfi}$ and $F_{xfo}$ are longitudinal forces of the turning inner-side front wheel and the turning outer-side front wheel, $F_{xri}$ and $F_{xro}$ are longitudinal forces of the turning inner-side rear wheel and the turning outer-side rear wheel, and the longitudinal forces have positive values for the driving force and negative values for the braking force. Further, $\theta_f$ is an angle formed by a line segment connecting a ground contact point and an instantaneous center of the left front wheel Fl and the right front wheel Fr in a neutral position with respect to a horizontal direction, and the angle $\theta_f$ is an anti-dive angle when the left front wheel Fl and the right front wheel Fr are in the neutral position. $\theta_r$ is an angle formed by a line segment connecting a ground contact point and an instantaneous center of the left rear wheel Rl and the right rear wheel Rr in a neutral position with respect to the horizontal direction, and the angle $\theta_r$ is an anti-lift angle when the left rear wheel Rl and the right rear wheel Rr are in the neutral position.

First, load transfer due to the application of a braking force to a wheel will be described.

Figure 3:
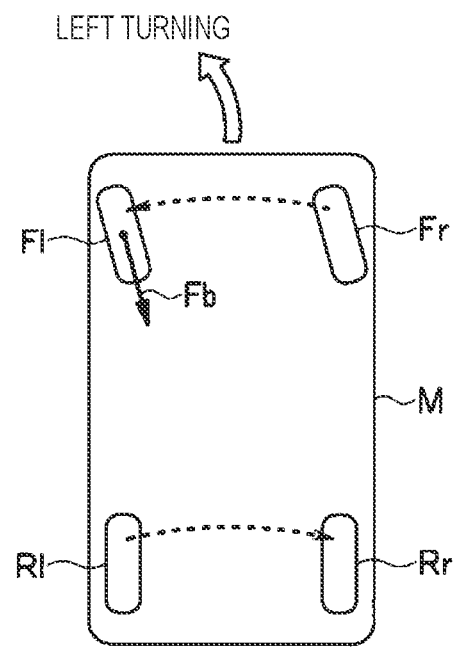
FIG. 3 is an explanatory diagram showing load transfer when four wheels are not driven and a turning inner-side front wheel is braked.

Load Transfer Due to Application of Braking Force to Turning Inner-Side Front Wheel As shown in FIG. 3, when the wheels Fl, Fr, Rl, Rr of the vehicle M are in the non-braking state during turning (left turning in the drawing), the longitudinal forces $F_{xfi}$, $F_{xfo}$ (positive values for the driving force and negative values for the braking force) acting on the left and right front wheels Fl, Fr are the same, and the longitudinal forces $F_{xri}$, $F_{xro}$ (positive values for the driving force and negative values for the braking force) acting on the left and right rear wheels Rl, Rr are the same, a constant braking force Fb (a negative value) is continuously applied to the turning inner-side front wheel (Fl) as indicated by a solid line arrow.

Then, since the longitudinal forces $F_{xri}$, $F_{xro}$ acting on the left and right rear wheels Rl, Rr are the same, a difference $\Delta Fr$ ($=F_{xri}-F_{xro}$) between the longitudinal forces $F_{xri}$, $F_{xro}$ remains 0. However, since the braking force Fb is applied to the turning inner-side front wheel (Fl), the difference $\Delta Ff$ ($=F_{xfi}-F_{xfo}$) between the longitudinal forces $F_{xfi}$, $F_{xfo}$ of the left and right front wheels Fl, Fr has a negative value ($\Delta Ff<0$).

As a result, as indicated by a broken line arrow in FIG. 3, load transfer occurs from the turning outer-side front wheel (Fr) to the turning inner-side front wheel (Fl), a ground contact load of the turning outer-side front wheel (Fr) decreases, and a ground contact load of the turning inner-side front wheel (Fl) increases. On the other hand, load transfer occurs from the turning inner-side rear wheel (Rl) to the turning outer-side rear wheel (Rr) between the left and right rear wheels Rl, Rr as indicated by a broken line arrow, a ground contact load of the turning inner-side rear wheel (Rl) decreases, and a ground contact load of the turning outer-side rear wheel (Rr) increases.

This is a case of static load transfer in which the constant braking force Fb is continuously applied to the turning inner-side front wheel (Fl), and a different behavior is exhibited in transient load transfer immediately (about 0.5 [sec]) after the braking force Fb starts to be applied to the turning inner-side front wheel (Fl). That is, immediately after the braking force Fb starts to be applied to the turning inner-side front wheel (Fl), first, an upward anti-dive force is generated in the front wheel suspension of the turning inner-side front wheel (Fl), causing an increase in the roll angle of the vehicle body. Therefore, the load transfer from the turning outer-side front wheel (Fr) to the turning inner-side front wheel (Fl) temporarily decreases. Conversely, the load transfer from the turning inner-side rear wheel (Rl) to the turning outer-side rear wheel (Rr) further increases.

Figure 4:
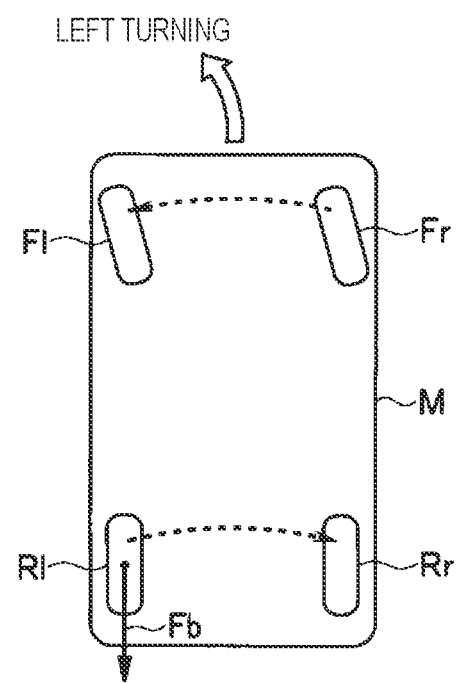
FIG. 4 is an explanatory diagram showing load transfer when four wheels are not driven and a turning inner-side rear wheel is braked.

Load Transfer Due to Application of Braking Force to Turning Inner-Side Rear Wheel As indicated by a solid line arrow in FIG. 4, when the vehicle M continues to apply the constant braking force Fb to the turning inner-side rear wheel (Rl) during turning, the difference $\Delta Fr$ between the longitudinal force of the turning outer-side rear wheel (Rr) and the longitudinal force of the turning inner-side rear wheel (Rl) has a negative value. Therefore, since the load transfer amount between the left and right front wheels Fl and Fr decreases, as indicated by a broken line arrow, load transfer occurs from the turning outer-side front wheel (Fr) to the turning inner-side front wheel (Fl). Then, the ground contact load of the turning outer-side front wheel (Fr) decreases, and the ground contact load of the turning inner-side front wheel (Fl) increases. On the other hand, since the load transfer amount between the left and right rear wheels Rl and Rr increases, as indicated by a broken line arrow, load transfer occurs from the turning inner-side rear wheel (Rl) to the turning outer-side rear wheel (Rr), the ground contact load of the turning inner-side rear wheel (Rl) decreases, and the ground contact load of the turning outer-side rear wheel (Rr) increases.

In this case, a different behavior is exhibited in transient load transfer immediately after the braking force Fb starts to be applied to the turning inner-side rear wheel (Rl). That is, immediately after the braking force Fb starts to be applied to the turning inner-side rear wheel (Rl), a downward anti-lift force is generated in the rear wheel suspension of the turning inner-side rear wheel (Rl), causing a decrease in the roll angle of the vehicle body. As a result, the load is transferred to a front shaft, the load transfer from the turning outer-side front wheel (Fr) to the turning inner-side front wheel (Fl) temporarily increases, and the ground contact load of the turning inner-side front wheel (Fl) increases. On the other hand, the load transfer from the turning inner-side rear wheel (Rl) to the turning outer-side rear wheel (Rr) decreases.

Figure 5:
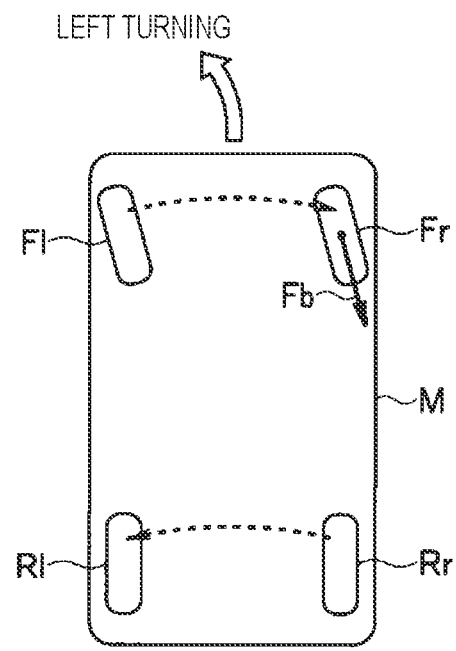
FIG. 5 is an explanatory diagram showing load transfer when four wheels are not driven and a turning outer-side front wheel is braked.

Load Transfer Due to Application of Braking Force to Turning Outer-Side Front Wheel As indicated by a solid line arrow in FIG. 5, when the constant braking force Fb is continuously applied to the turning outer-side front wheel (Fr), the longitudinal forces $F_{xri}$, $F_{xro}$ of the left and right rear wheels Rl, Rr are the same ($\Delta Fr=0$), but the difference $\Delta Ff$ between the longitudinal forces $F_{xfi}$, $F_{xfo}$ of the left and right front wheels Fl, Fr has a positive value ($\Delta Ff>0$). Therefore, the load transfer amount between the left and right front wheels Fl and Fr increases, and as indicated by a broken line arrow, load transfer occurs from the turning inner-side front wheel (Fl) to the turning outer-side front wheel (Fr). As a result, the ground contact load of the turning inner-side front wheel (Fl) decreases, and the ground contact load of the turning outer-side front wheel (Fr) increases. On the other hand, since the load transfer amount between the left and right rear wheels Rl, Rr decreases, as indicated by a broken line arrow, load transfer occurs from the turning outer-side rear wheel (Rr) to the turning inner-side rear wheel (Rl), the ground contact load of the turning outer-side rear wheel (Rr) decreases, and the ground contact load of the turning inner-side rear wheel (Rl) increases.

In this case as well, a different behavior is exhibited in transient load transfer immediately (about 0.5 [sec]) after the braking force Fb starts to be applied to the turning outer-side front wheel (Fr). That is, immediately after the braking force Fb is applied to the turning outer-side front wheel (Fr), an upward anti-dive force is generated in the front wheel suspension of the turning outer-side front wheel (Fr), causing a decrease in the roll angle of the vehicle body. Therefore, the load transfer from the turning inner-side front wheel (Fl) to the turning outer-side front wheel (Fr) temporarily decreases, and the load transfer from the turning outer-side rear wheel (Rr) to the turning inner-side rear wheel (Rl) further increases.

Figure 6:
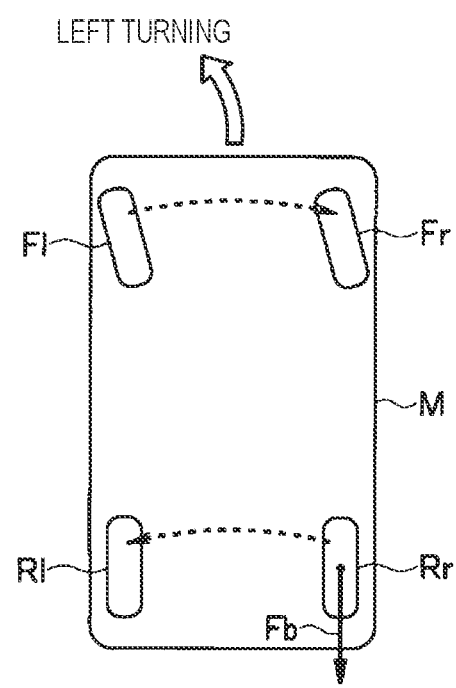
FIG. 6 is an explanatory diagram showing load transfer when four wheels are not driven and a turning outer-side rear wheel is braked.

Load Transfer Due to Application of Braking Force to Turning Outer-Side Rear Wheel As indicated by a solid line arrow in FIG. 6, when the constant braking force Fb is continuously applied to the turning outer-side rear wheel (Rr) of the vehicle M during turning, the difference $\Delta Fr$ between the longitudinal force of the turning outer-side rear wheel (Rr) and the longitudinal force of the turning inner-side rear wheel (Rl) has a positive value. Therefore, the load transfer amount between the left and right front wheels Fl and Fr increases, and as indicated by a broken line arrow, load transfer occurs from the turning inner-side front wheel (Fl) to the turning outer-side front wheel (Fr), the ground contact load of the turning inner-side front wheel (Fl) decreases, and the ground contact load of the turning outer-side front wheel (Fr) increases. On the other hand, since the load transfer amount between the left and right rear wheels Rl, Rr decreases, as indicated by a broken line arrow, load transfer occurs from the turning outer-side rear wheel (Rr) to the turning inner-side rear wheel (Rl), the ground contact load of the turning outer-side rear wheel (Rr) decreases, and the ground contact load of the turning inner-side rear wheel (Rl) increases.

In this case as well, in transient load transfer immediately after the braking force Fb starts to be applied to the turning outer-side rear wheel (Rr), a downward anti-lift force is generated in the rear wheel suspension of the turning outer-side rear wheel (Rr), causing an increase in the roll angle of the vehicle body. Therefore, the load transfer from the turning inner-side front wheel (Fl) to the turning outer-side front wheel (Fr) temporarily increases, and the load transfer from the turning outer-side rear wheel (Rr) to the turning inner-side rear wheel (Rl) decreases.

In the drawings, the left turning has been described as an example, but the load transfer between the turning inner-side and outer-side wheels occurs regardless of a turning direction of the vehicle M. Therefore, in the case of right turning, the right and left wheels are applied in reverse.

Reduction of Degree of Understeer Due to Application of Braking Force

As described above, when the turning behavior of the vehicle M is in a state in which the degree of understeer is high, the braking force Fb is applied to the turning inner-side front and rear wheels (Fl, Rl). As a result, it can be seen that the ground contact load of the turning inner-side front wheel (Fl) increases, and a resulting lateral force can cause the vehicle M to generate a yaw moment in the turning direction.

Incidentally, when the degree of understeer is high, in particular, the lateral force of the turning inner-side front wheel (Fl) is insufficient compared to a necessary lateral force, and thus it is necessary to maximize the load transfer to the turning inner-side front wheel (Fl) due to deceleration of the vehicle M caused by the application of a braking force.

Here, the load transfer to the turning inner-side front wheel (Fl) in consideration of a transient change immediately after a braking force starts to be applied to any one of the wheels Fl, Fr, Rl, Rr is summarized in Table 1.

TABLE 1

| Wheel to which braking force is applied | Change in ground contact load of turning inner-side front wheel |
| --- | --- |
| Turning inner-side front wheel | Decrease once and then increase statically (small) |
| Turning inner-side rear wheel | Increase once and then increase statically (large) |
| Turning outer-side front wheel | Increase once and then decrease statically (small) |
| Turning outer-side rear wheel | Decrease once and then decrease statically (large) |

As is clear from Table 1, the ground contact load of the turning inner-side front wheel (Fl) can be increased by applying the braking force Fb to the turning inner-side rear wheel (Rl). Conversely, it can be seen that by applying the braking force Fb to the turning outer-side rear wheel (Rr), the ground contact load of the turning inner-side front wheel (Fl) is reduced most.

Figure 7:
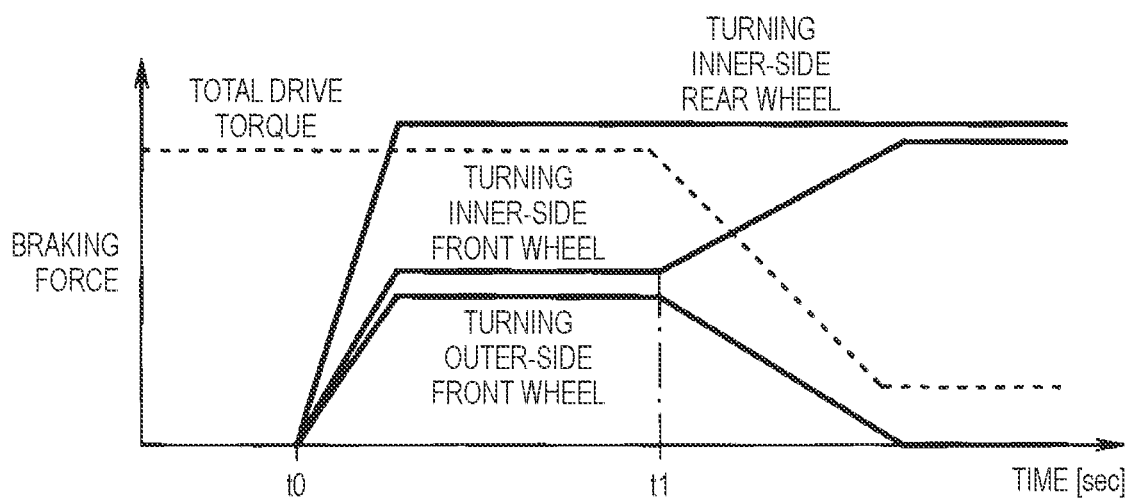
FIG. 7 is a time chart showing changes in a braking force and a total drive torque applied to the turning inner-side front and rear wheels and the turning outer-side front wheel immediately after a high degree of understeer is detected.

Table 1 described above takes into consideration the transient load transfer immediately after a braking force starts to be applied to any one of the wheels Fl, Fr, Rl, Rr. In this case, as shown in FIG. 7, when a predetermined time (t1) elapses after braking force control is started (elapsed time t0), when a braking force applied to the turning outer-side front wheel (Fr) is decreased and a braking force applied to the turning inner-side front wheel (Fl) is increased, the yaw moment generated in the vehicle M in the turning direction can be gradually increased. As a result, a total drive torque can be reduced.

Driving forces generated in the left and right front wheels Fl, Fr and the left and right rear wheels Rl, Rr can be calculated based on shaft torques acting on the output shafts 1a, 6a of the drive sources 1, 6 detected by the front shaft torque sensor 24a and the rear shaft torque sensor 24b, respectively.

That is, the driving force can be obtained according to:

driving force=shaft torque×final reduction gear ratio×transmission efficiency/movable radius of tire where, if the final reduction gear ratio, the transmission efficiency, and the movable radius of tire are fixed values, the driving force is determined by a variable of the shaft torque, and the torque sensors 24a, 24b function as a driving force detection unit of the present disclosure.

Next, load transfer due to application of a driving force will be described.

Figure 8:
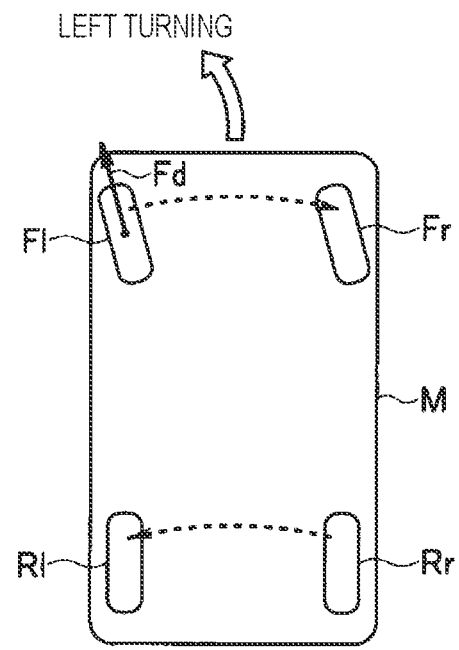
FIG. 8 is an explanatory diagram showing load transfer when only the turning inner-side front wheel is driven.

Load Transfer Due to Application of Driving Force to Turning Inner-Side Front Wheel As shown in FIG. 8, when the wheels Fl, Fr, Rl, Rr of the vehicle M are in the non-braking state during turning (left turning in the drawing), the longitudinal forces $F_{xfi}$, $F_{xfo}$ acting on the left and right front wheels Fl, Fr are the same, and the longitudinal forces $F_{xri}$, $F_{xro}$ acting on the left and right rear wheels Rl, Rr are the same, a constant driving Force Fd (a positive value) is continuously applied to the turning inner-side front wheel (Fl) as indicated by a solid line arrow.

Then, since the longitudinal forces $F_{xri}$, $F_{xro}$ acting on the left and right rear wheels Rl, Rr are the same, the difference ΔFr between the longitudinal forces $F_{xri}$, $F_{xro}$ remains 0. However, since the driving force Fd is applied to the turning inner-side front wheel (Fl), the difference ΔFf between the longitudinal forces $F_{xfi}$, $F_{xfo}$ of the left and right front wheels Fl, Fr has a positive value (ΔFf>0).

Therefore, as indicated by a broken line arrow in FIG. 8, in the static load transfer amounts $\Delta W_f$, $\Delta W_r$ when the constant driving force Fd is applied to the turning inner-side front wheel (Fl), the static load transfer amount $\Delta W_f$ from the turning inner-side front wheel (Fl) to the turning outer-side front wheel (Fr) increases, and the static load transfer amount $\Delta W_r$ from the turning inner-side rear wheel (Rl) to the turning outer-side rear wheel (Rr) decreases (in other words, the load transfer amount from the turning outer-side rear wheel (Rr) to the turning inner-side rear wheel (Rl) increases).

As a result, the ground contact load of the turning inner-side front wheel (Fl) decreases, and the ground contact load of the turning outer-side front wheel (Fr) increases. On the other hand, since the load transfer amount between the left and right rear wheels Rl, Rr decreases, as indicated by a broken line arrow, load transfer occurs from the turning outer-side rear wheel (Rr) to the turning inner-side rear wheel (Rl), the ground contact load of the turning outer-side rear wheel (Rr) decreases, and the ground contact load of the turning inner-side rear wheel (Rl) increases.

This is a case of static load transfer in which the constant driving force Fd is continuously applied to the turning inner-side front wheel (Fl), and a different behavior is exhibited in transient load transfer immediately (about 0.5 [sec]) after the driving force Fd starts to be applied to the turning inner-side front wheel (Fl). That is, in the transient load transfer immediately after the driving force Fd starts to be applied to the turning inner-side front wheel (Fl), a downward anti-lift force acts on the front wheel suspension of the turning inner-side front wheel (Fl), causing a decrease in the roll angle of the vehicle body. Therefore, the load transfer from the turning inner-side front wheel (Fl) to the turning outer-side front wheel (Fr) temporarily decreases. Conversely, the load transfer from the turning outer-side rear wheel (Rr) to the turning inner-side rear wheel (Rl) further increases.

Figure 9:
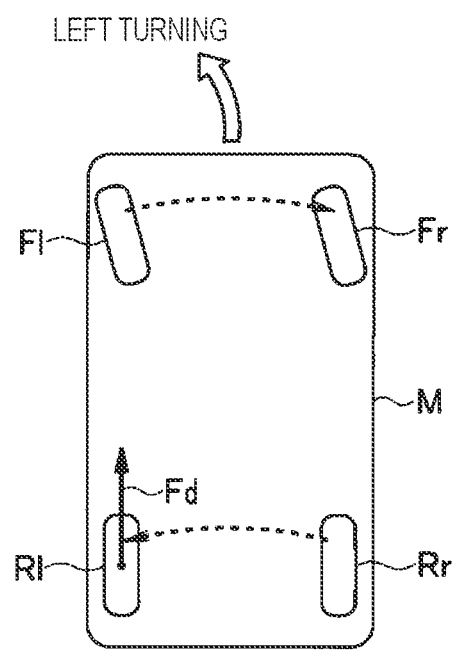
FIG. 9 is an explanatory diagram showing load transfer when only the turning inner-side rear wheel is driven.

Load Transfer Due to Application of Driving Force to Turning Inner-Side Rear Wheel As indicated by a solid line arrow in FIG. 9, when the vehicle M continues to apply the constant driving force Fd (a positive value) to the turning inner-side rear wheel (Rl) during turning, the longitudinal forces $F_{xfi}$, $F_{xfo}$ acting on the left and right front wheels Fl, Fr are the same, and thus the difference ΔFf remains 0. However, since the driving force Fd is applied to the turning inner-side rear wheel (Rl), the difference ΔFr between the longitudinal forces $F_{xri}$, $F_{xro}$ of the left and right rear wheels Rl, Rr has a positive value (ΔFr>0).

Therefore, as indicated by a broken line arrow, the static load transfer amount $\Delta W_f$ from the turning inner-side front wheel (Fl) to the turning outer-side front wheel (Fr) increases, and the static load transfer amount $\Delta W_r$ from the turning inner-side rear wheel (Rl) to the turning outer-side rear wheel (Rr) decreases (in other words, the load transfer amount from the turning outer-side rear wheel (Rr) to the turning inner-side rear wheel (Rl) increases).

In this case, in the transient load transfer immediately after the driving force Fd is applied to the turning inner-side front wheel (Fl), an upward anti-squat force acts on the rear wheel suspension of the turning inner-side rear wheel (Rl), causing an increase in the roll angle of the vehicle body. Therefore, the load transfer from the turning inner-side front wheel (Fl) to the turning outer-side front wheel (Fr) further increases. Conversely, the load transfer from the turning outer-side rear wheel (Rr) to the turning inner-side rear wheel (Rl) temporarily decreases.

Figure 10:
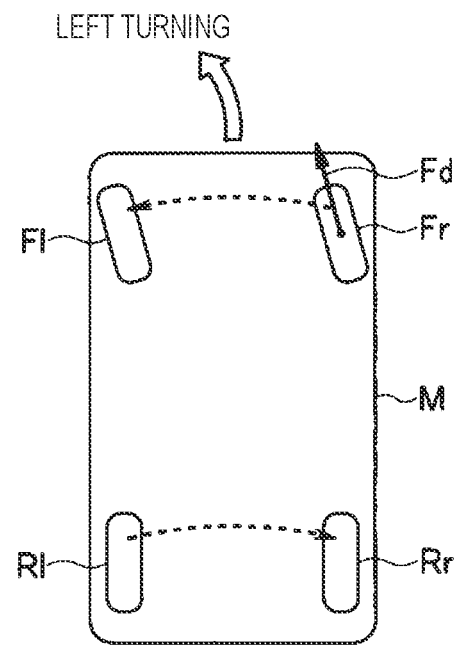
FIG. 10 is an explanatory diagram showing load transfer when only the turning outer-side front wheel is driven.

Load Transfer Due to Application of Driving Force to Turning Outer-Side Front Wheel As indicated by a solid line arrow in FIG. 10, when the constant driving force Fd is continuously applied to the turning outer-side front wheel (Fr), the longitudinal forces $F_{xri}$, $F_{xro}$ of the left and right rear wheels Rl, Rr are the same (ΔFr=0), but the difference ΔFf between the longitudinal forces $F_{xfi}$, $F_{xfo}$ of the left and right front wheels Fl, Fr has a negative value (ΔFf<0).

Therefore, as indicated by a broken line arrow, the static load transfer amount $\Delta W_f$ from the turning inner-side front wheel (Fl) to the turning outer-side front wheel (Fr) decreases (in other words, the static load transfer amount $\Delta W_f$ from the turning outer-side front wheel (Fr) to the turning inner-side front wheel (Fl) increases). The static load transfer amount $\Delta W_r$ from the turning inner-side rear wheel (Rl) to the turning outer-side rear wheel (Rr) increases.

In this case, in the transient load transfer immediately after the driving force Fd starts to be applied to the turning inner-side front wheel (Fl), a downward anti-lift force acts on the front wheel suspension of the turning outer-side front wheel (Fr), causing an increase in the roll angle of the vehicle body. Therefore, the load transfer from the turning outer-side front wheel (Fr) to the turning inner-side front wheel (Fl) temporarily decreases. Conversely, the load transfer from the turning inner-side rear wheel (Rl) to the turning outer-side rear wheel (Rr) further increases.

Figure 11:
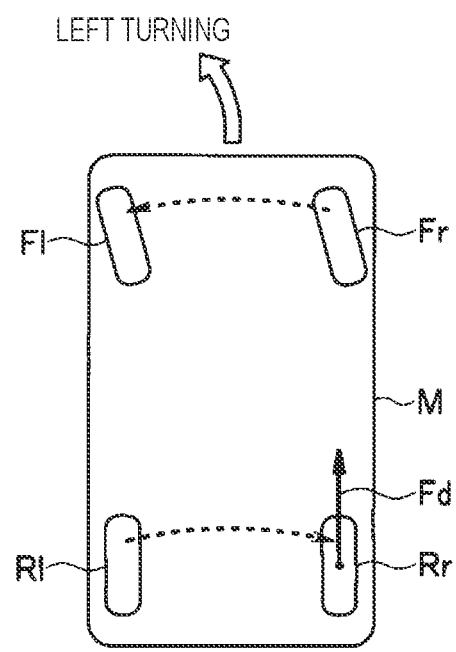
FIG. 11 is an explanatory diagram showing load transfer when only the turning outer-side rear wheel is driven.

Load Transfer Due to Application of Driving Force to Turning Outer-Side Rear Wheel As indicated by a solid line arrow in FIG. 11, when the constant driving force Fd is continuously applied to the turning outer-side rear wheel (Rr) of the vehicle M during turning, the longitudinal forces $F_{xfi}$, $F_{xfo}$ of the left and right front wheels Fl, Fr are the same (ΔFf=0), but the difference ΔFf between the longitudinal forces $F_{xri}$, $F_{xro}$ of the left and right rear wheels Rl, Rr has a negative value (ΔFf<0).

Therefore, as indicated by a broken line arrow, the static load transfer amount $\Delta W_f$ from the turning inner-side front wheel (Fl) to the turning outer-side front wheel (Fr) decreases (in other words, the static load transfer amount $\Delta W_f$ from the turning outer-side front wheel (Fr) to the turning inner-side front wheel (Fl) increases). The static load transfer amount $\Delta W_r$ from the turning inner-side rear wheel (Rl) to the turning outer-side rear wheel (Rr) increases.

In this case, in transient load transfer immediately after the driving force Fd is applied to the turning inner-side rear wheel (Rl), an upward anti-squat force acts on the rear wheel suspension of the turning outer-side rear wheel (Rr), causing a decrease in the roll angle of the vehicle body. Therefore, the load transfer from the turning outer-side front wheel (Fr) to the turning inner-side front wheel (Fl) further increases. Conversely, the load transfer from the turning inner-side rear wheel (Rl) to the turning outer-side rear wheel (Rr) temporarily decreases.

Here, the load transfer to the turning inner-side front wheel (Fl) in consideration of a transient change immediately after a driving force starts to be applied to any one of the wheels Fl, Fr, Rl, Rr is summarized in Table 2.

TABLE 2

| Wheel to which driving force is to be applied | Change in ground contact load of turning inner-side front wheel |
|---|---|
| Turning inner-side front wheel | Decrease once and then decrease statically (small) |
| Turning inner-side rear wheel | Increase once and then decrease statically (large) |
| Turning outer-side front wheel | Increase once and then increase statically (small) |
| Turning outer-side rear wheel | Decrease once and then increase statically (large) |

As is clear from Table 2, the ground contact load of the turning inner-side front wheel (Fl) can be increased by applying the driving force Fd to the turning outer-side rear wheel (Rr). Conversely, it can be seen that by applying the driving force Fd to the turning inner-side rear wheel (Rl), the ground contact load of the turning inner-side front wheel (Fl) is reduced most.

Combination of Braking and Driving Forces for Increasing Ground Contact Load of Turning Inner-Side Front Wheel Based on changes in the ground contact load of the turning inner-side front wheel (Fl) shown in Tables 1 and 2, a combination of braking and driving forces for increasing the ground contact load of the turning inner-side front wheel (Fl) is shown below. In a state before braking and driving forces are applied during turning, the wheels Fl, Fr, Rl, and Rr of the vehicle M are in the non-braking state, the longitudinal forces $F_{xfi}$, $F_{xfo}$ acting on the left and right front wheels Fl, Fr are the same, and the longitudinal forces $F_{xri}$, $F_{xro}$ acting on the left and right rear wheels Rl, Rr are the same.

Figure 12:
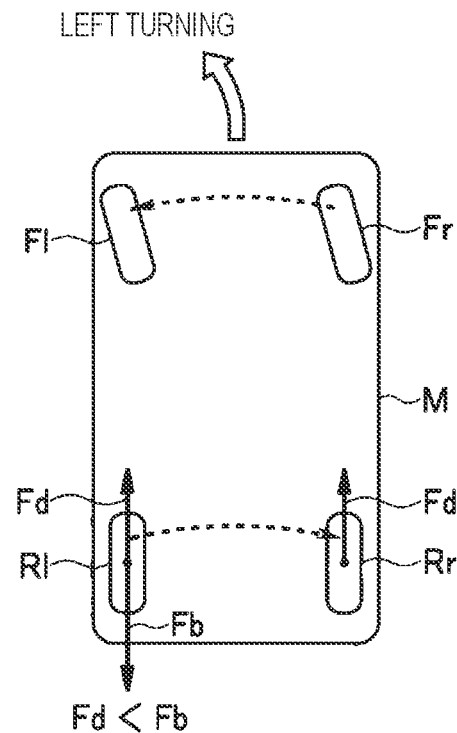
FIG. 12 is an explanatory diagram showing a state in which rear wheels are drive wheels and the turning inner-side rear wheel is braked.

1 an Aspect in which Turning Inner-Side Rear Wheel is Braked and Turning Outer-Side Rear Wheel is Driven The driving force Fd is applied to the left and right rear wheels Rl, Rr from the rear drive source 6 via the rear differential 7. Therefore, as shown in FIG. 12, to drive the turning outer-side rear wheel Rr with the driving force Fd, the braking force Fb that cancels the driving force Fd is applied to the turning inner-side rear wheel Rl. Further, the braking force Fb is generated on the turning inner-side rear wheel Rl in a way that the braking force Fb to be applied to the turning inner-side rear wheel Rl is set to satisfy Fd<Fb. In this case, when the degree of understeer is high, the braking force Fb is adjusted according to the degree of understeer, for example, by increasing the braking force Fb.

In this way, by applying the braking force Fb to the turning inner-side rear wheel (Rl) and applying the driving force Fd to the turning outer-side rear wheel (Rr), the sinking of the turning outer-side rear wheel (Rr) is prevented by the action of the anti-squat force of the rear wheel suspension. As a result, the turning inner-side front wheel (Fl) located diagonally sinks, the ground contact load of the turning inner-side front wheel (Fl) increases, and the degree of understeer can be reduced.

Figure 13:
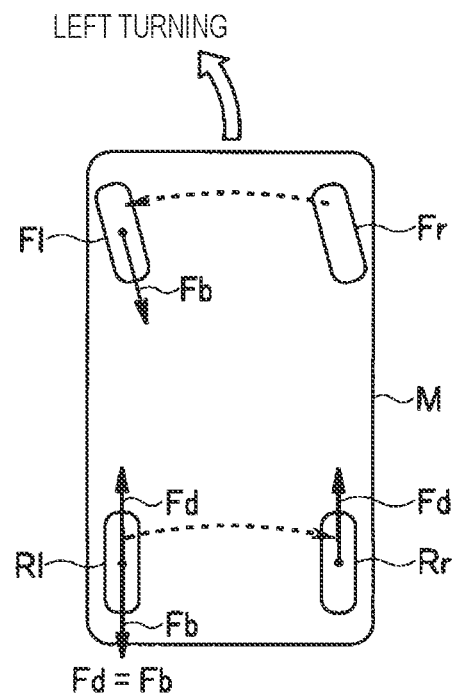
FIG. 13 is an explanatory diagram showing a state in which rear wheels are drive wheels and the turning inner-side front and rear wheels are braked.

2 an Aspect in which Turning Inner-Side Front Wheel is Braked and Turning Outer-Side Rear Wheel is Driven The driving force Fd is applied to the left and right rear wheels Rl, Rr from the rear drive source 6 via the rear differential 7. Therefore, as shown in FIG. 13, to drive the turning outer-side rear wheel Rr with the driving force Fd, the braking force Fb that cancels the driving force Fd is applied to the turning inner-side rear wheel Rl. Further, the braking force Fb is applied to the turning inner-side front wheel (Fl).

In this case, when the degree of understeer is high, the braking force Fb to be applied to the turning inner-side rear wheel (Rl) is adjusted according to the degree of understeer, for example, by increasing the braking force Fb.

Figure 14:
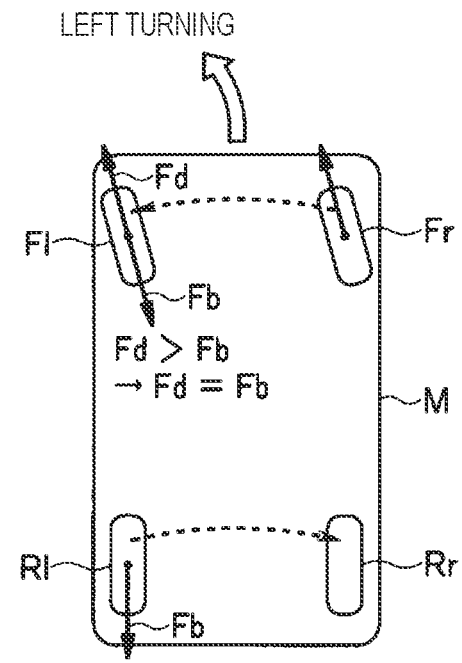
FIG. 14 is an explanatory diagram showing a state in which front wheels are drive wheels and the turning inner-side front and rear wheels are braked.

3 an Aspect in which Turning Inner-Side Rear Wheel is Braked and Turning Outer-Side Front Wheel is Driven The driving force Fd is applied to the left and right front wheel Fl, Fr from the front drive source 1 via the front differential 2. Therefore, as shown in FIG. 14, to drive the turning outer-side front wheel Fr with the driving force Fd, the braking force Fb that cancels the driving force Fd is applied to the turning inner-side front wheel Fl. In this case, in an initial stage in which understeer is detected, the braking force Fb to be applied to the turning inner-side front wheel (Fl) is set to satisfy braking force Fb<driving force Fd to reduce the roll angle, and then set to satisfy braking force Fb=driving force Fd to cancel the driving force Fd. Further, when the degree of understeer is high, the braking force Fb is adjusted according to the degree of understeer, for example, by increasing the braking force Fb so that Fd<Fb.

In this way, by applying the braking force Fb to the turning inner-side rear wheel (Rl) and the driving force Fd to the turning outer-side front wheel (Fr), although the roll angle increases due to the anti-lift of the front wheel suspension, a stroke extension of the turning outer-side front wheel (Fr) can be prevented. As a result, an increase in the ground contact load of the turning outer-side front wheel (Fr) is prevented, the ground contact load of the turning inner-side front wheel (Fl) relatively increases, and the degree of understeer can be reduced.

4 Aspects 1 to 3 Described Above are Switched According to the Degree of Understeer The controls of 1 to 3 described above are switched in the order of 3 to 2 to 1 as the degree of understeer increases (the yaw rate deviation ΔYr increases). As a result, the ground contact load of the turning inner-side front wheel (Fl) can be increased according to the degree of understeer, and the degree of understeer can be reduced.

When the degree of understeer further increases despite the execution of the control of 1 to 4 described above, a driving assistance control unit 11a applies the braking force Fb to the turning inner-side front and rear wheels (Fl, Rl) after a predetermined time elapses to apply a maximum yaw moment in the turning direction and shifts to control for gradually reducing the driving force Fd to be applied to all four wheels. As a result, the ground contact load of the turning inner-side front wheel (Fl) can be restored.

Aspect in Four-Wheel Independent Motors

When four-wheel independent motors that independently drive the wheels Fl, Fr, Rl, and Rr of the vehicle M are adopted as the drive source, the driving assistance control unit 11a can individually apply the driving force Fd to the wheels Fl, Fr, Rl, and Rr. Therefore, when the driving force Fb is applied to one wheel, it is not necessary to apply the braking force Fb for canceling the driving force Fd to the other wheel as in the case where the front wheel drive shafts 3l, 3r and the rear wheel drive shafts 8l, 8r shown in FIG. 1 are respectively driven by the front drive source 1 and the rear drive source 6. A braking force in the four-wheel independent motors is generated by friction braking or regenerative braking, or by cooperation between friction braking and regenerative braking. Therefore, the electric motor functions as a brake unit.

Figure 15:
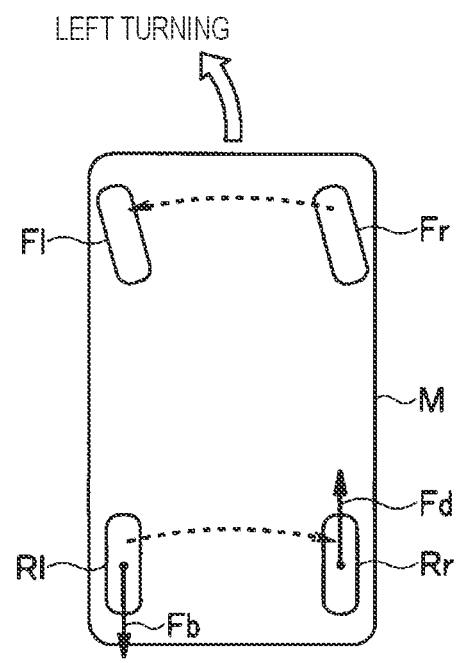
FIG. 15 is an explanatory diagram showing a state in which the turning inner-side rear wheel is braked and the turning outer-side rear wheel is driven.

1' an Aspect in which Turning Inner-Side Rear Wheel is Braked and Turning Outer-Side Rear Wheel is Driven As shown in FIG. 15, when the driving force Fd is applied to the turning outer-side rear wheel (Rr), it is not necessary to apply the braking force Fb for canceling the driving force Fd to the turning inner-side rear wheel (Rl). Therefore, only the original braking force Fb may be applied to the turning inner-side rear wheel (Rl).

Figure 16:
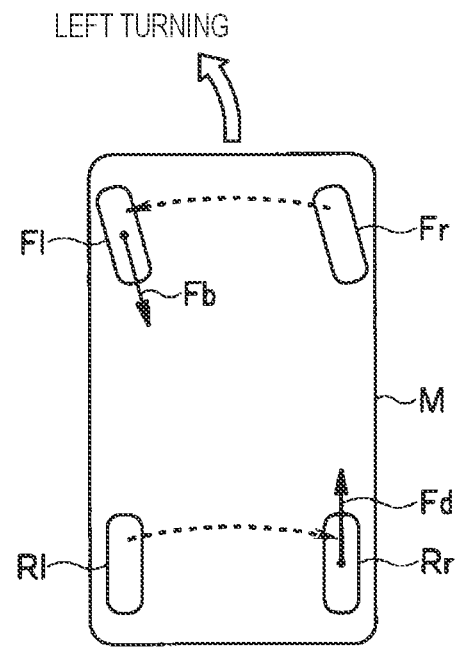
FIG. 16 is an explanatory diagram showing a state in which the turning inner-side front wheel is braked and the turning outer-side rear wheel is driven.

2' an Aspect in which Turning Inner-Side Front Wheel is Braked and Turning Outer-Side Rear Wheel is Driven As shown in FIG. 16, when the driving force Fd is applied to the turning outer-side rear wheel (Rr) and the braking force Fb is applied to the turning inner-side front wheel (Fl), it is not necessary to apply the braking force Fb for canceling the driving force Fd to the turning inner-side rear wheel (Rl).

Figure 17:
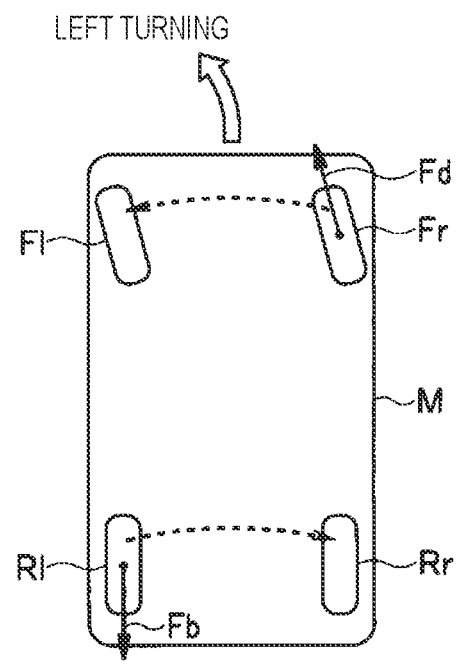
FIG. 17 is an explanatory diagram showing a state in which the turning outer-side front wheel is driven and the turning inner-side rear wheel is braked.

3' an Aspect in which Turning Inner-Side Rear Wheel is Braked and Turning Outer-Side Front Wheel is Driven As shown in FIG. 17, when the driving force Fd is applied to the turning outer-side front wheel (Fr) and the braking force Fb is applied to the turning inner-side rear wheel (Rl), it is not necessary to apply the braking force Fb for canceling the driving force Fd to the turning outer-side rear wheel (Rr).

Figure 18:
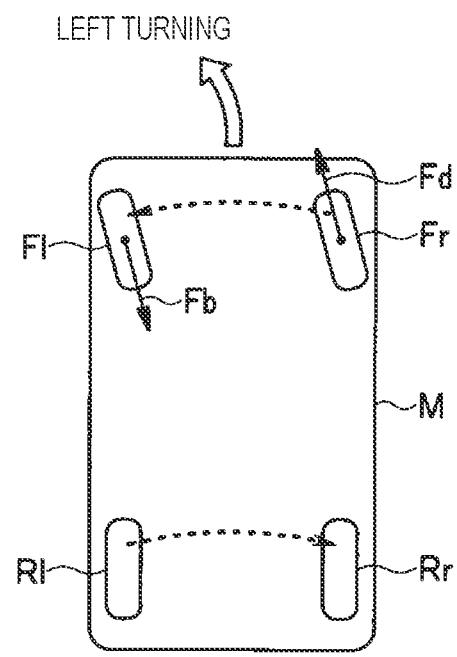
FIG. 18 is an explanatory diagram showing a state in which the turning inner-side front wheel is braked and the turning outer-side front wheel is driven.

4' an Aspect in which Turning Inner-Side Front Wheel is Braked and Turning Outer-Side Front Wheel is Driven As shown in FIG. 18, when the driving force Fd is applied to the turning outer-side front wheel (Fr), it is not necessary to apply the braking force Fb for canceling the driving force Fd to the turning inner-side front wheel (Fl). Therefore, it is possible to easily combine the above aspects shown in FIGS. 3 and 10 for control.

As described above, in the present embodiment, when a high degree of understeer is detected during turning in a four-wheel drive vehicle, the driving assistance control unit 11a increases a ground contact load with respect to a turning inner-side front wheel (Fl) by the cooperation of the driving force Fd from the drive sources 1, 6 and the braking force Fb from the HCU 11, and efficiently reduces the degree of understeer by balancing a yaw moment in a turning direction and a total driving force. As a result, discomfort given to occupants including a driver can be reduced early.

According to the present disclosure, when the braking force control unit determines that the deviation between the reference yaw rate for determining the degree of understeer during turning of the vehicle and the actual yaw rate detected by the yaw rate detection unit exceeds the predetermined deviation reference value, the travel control unit applies a braking force to one of the turning inner-side rear wheel and the turning inner-side front wheel. At this time, since a driving force is applied to one of the turning outer-side rear wheel and the turning outer-side front wheel, when a high degree of understeer is detected, the degree of understeer can be efficiently reduced by the cooperation of the braking force and the driving force, and the discomfort given to occupants including a driver can be reduced.

The present disclosure is not limited to the embodiment described above, for example, one of the front drive source 1 and the rear drive source 6 may be an electric motor and the other may be an engine. Further, a three-motor system may be used in which one of the front drive source and the rear drive source is an electric motor, and left and right wheels driven by the other drive source are driven by independent electric motors.

What is claimed is:

1. A turning behavior control device for a vehicle in which left and right front wheels are steered wheels, the turning behavior control device comprising:
a yaw rate sensor configured to detect an actual yaw rate acting on a vehicle;
a brake unit configured to independently apply a braking force to the left and right front wheels and left and right rear wheels;
drive sources configured to drive the left and right front wheels and the left and right rear wheels, wherein the drive sources being an engine or electric motor of the vehicle; and
a travel control unit including:
  a processor; and
  a memory storing programs that, when executed by the processor, cause the processor to:
    control the braking force of the brake unit and an output of the drive sources;
    calculate a deviation between a reference yaw rate for determining a degree of understeer during turning of the vehicle and the actual yaw rate detected by the yaw rate sensor;
    output, to the brake unit, a first signal for applying the braking force to one of a turning inner-side rear wheel and a turning inner-side front wheel when determining that the calculated deviation exceeds a predetermined deviation reference value; and
    output, to the drive sources, a signal for applying a driving force to one of a turning outer-side rear wheel and a turning outer-side front wheel when the first signal is output.

2. The turning behavior control device for a vehicle according to claim 1, wherein
the drive sources includes a front drive source that drives the left and right front wheels and a rear drive source that drives the left and right rear wheels, and
when determining that the deviation exceeds the predetermined deviation reference value, the travel control unit outputs, to the rear drive source, a signal for applying the driving force to the left and right rear wheels, and the travel control unit outputs, to the brake unit, a signal for applying the braking force to the turning inner-side rear wheel.

3. The turning behavior control device for a vehicle according to claim 2, further comprising:
a torque sensor configured to detect the driving force acting on each of the wheels, wherein
when determining that the deviation exceeds the predetermined deviation reference value, the travel control unit outputs, to the brake unit, a signal for applying, to the turning inner-side rear wheel, the braking force that cancels the driving force acting on the turning inner-side rear wheel detected by the torque sensor.

4. The turning behavior control device for a vehicle according to claim 2, further comprising:
a torque sensor configured to detect the driving force acting on each of the wheels, wherein
when determining that the deviation exceeds the predetermined deviation reference value, the travel control unit outputs, to the brake unit, a signal for applying, to the turning inner-side rear wheel, the braking force greater than the driving force acting on the turning inner-side rear wheel detected by the torque sensor.

5. The turning behavior control device for a vehicle according to claim 1, further comprising:
a torque sensor configured to detect the driving force acting on each of the wheels, wherein the drive sources includes a front drive source that drives the left and right front wheels and a rear drive source that drives the left and right rear wheels, and when determining that the deviation exceeds the predetermined deviation reference value, the travel control unit outputs, to the front drive source, a signal for applying the driving force to the left and right front wheels, the travel control unit outputs, to the brake unit, a signal for applying a braking force to the turning inner-side front wheel.

* * * * *